United States Patent
Baig

(10) Patent No.: US 6,268,042 B1
(45) Date of Patent: Jul. 31, 2001

(54) HIGH STRENGTH LOW DENSITY BOARD FOR FURNITURE INDUSTRY

(75) Inventor: Mirza A. Baig, Des Plaines, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

(21) Appl. No.: 09/309,969

(22) Filed: May 11, 1999

(51) Int. Cl.⁷ .................... B32B 3/00; B32B 5/16
(52) U.S. Cl. .............. 428/211; 428/326; 428/532; 428/535; 428/537.7; 428/70; 428/74; 428/211; 106/89; 106/97; 106/98; 106/99
(58) Field of Search .................. 106/89, 97, 98, 106/99; 428/70, 74, 211, 326, 532, 535, 537.7

(56) References Cited

U.S. PATENT DOCUMENTS

| | | |
|---|---|---|
| 3,390,003 | 6/1968 | Cooper . |
| 4,101,335 | 7/1978 | Barrable . |
| 4,132,555 | 1/1979 | Barrable . |
| 4,680,059 | 7/1987 | Cook et al. . |
| 4,803,107 | 2/1989 | Knowles . |
| 4,808,229 | 2/1989 | Arhelger . |
| 5,085,898 | 2/1992 | Welteke et al. . |
| 5,167,710 | 12/1992 | Leroux et al. . |
| 5,171,366 | 12/1992 | Richards et al. . |
| 5,342,566 | 8/1994 | Schäfer et al. . |
| 5,422,168 | 6/1995 | O'Dell et al. . |
| 5,558,710 | 9/1996 | Baig . |
| 5,614,307 | 3/1997 | Andersen et al. . |
| 5,631,052 | 5/1997 | Andersen et al. . |

OTHER PUBLICATIONS

U.S.G. Interiors Inc. brochure for MICOR Products, Nov. 1992.

*Primary Examiner*—Richard Weisberger
(74) *Attorney, Agent, or Firm*—Greer, Burns & Crain, Ltd; John M. Lorenzen; David F. Janci

(57) ABSTRACT

A high strength, low density fiber board panel for use in the furniture industry is provided, including mineral wool, a lightweight aggregate material, cellulosic fiber, a binding agent and gypsum. The mineral wool makes up approximately 0% to 33%, the lightweight aggregate material approximately 25% to 41%, the cellulosic fiber approximately 20% to 35%, the binding agent approximately 5% to 9%, and the gypsum approximately 0% to 23%, of the dry solids weight of the panel.

25 Claims, No Drawings

HIGH STRENGTH LOW DENSITY BOARD FOR FURNITURE INDUSTRY

BACKGROUND ART

The present invention relates to fiber board panels for use in the furniture industry. More particularly, the present invention relates to a means by which fiber board panels can be made significantly stronger without significantly increasing their density. The present invention also relates to a novel mineral wool/lightweight aggregate material/cellulose fiber/binding agent composition, which can be used to manufacture high strength low density fiber board panels.

Fiber board panels are well known in the furniture industry, and are widely used as wall panels, office dividers, tackboards, chalkboards, and stoveboards, among other things. The stronger the panels are the better. At the same time, for ease of transport and installation, the less dense and lighter the panels are the better. Unfortunately, in traditional fiber board panels, strength and density have always seemed to be closely and directly related, which means that any attempt to increase the strength of a particular panel would necessarily result an increase in that panel's density, and therefore, weight.

Accordingly, it is an object of the present invention to produce an improved fiber board panel having high strength and low density, and which is suitable for use in the furniture industry.

It is another object of the present invention to provide an improved process for producing high strength low density fiber board panels which are suitable for use in the furniture industry.

DISCLOSURE OF INVENTION

The above objects are met or exceeded by the present fiber board panel and process for making same. The present fiber board panel includes a composition of mineral wool, a lightweight aggregate material, cellulosic fiber, a binding agent and gypsum. Surprisingly beneficial results were obtained by decreasing the mineral wool content, simultaneously increasing the cellulosic fiber content of conventional panels, and adding gypsum. Further modifications to the conventional recipe for fiber board panels may be made, including increasing the amount of lightweight aggregate material while decreasing the starch content.

An improved process for making the present high strength low density fiber board panel involves creating a dispersion of the above ingredients, in specific proportions by weight, and then causing the dispersion to flow onto a support mechanism for dewatering.

More specifically, a high strength low density fiber board panel is provided comprising mineral wool, a lightweight aggregate material, cellulosic fiber, a binding agent and gypsum, where the mineral wool comprises approximately 0% to approximately 33%, the lightweight aggregate material comprises approximately 25% to approximately 41%, the cellulosic fiber comprises approximately 20% to approximately 35%, the binding agent comprises approximately 5% to approximately 9%, and the gypsum comprises approximately 0% to approximately 23%, of a dry solids weight of the panel.

BEST MODE OF CARRYING OUT THE INVENTION

Fiber board panels are commonly used in the furniture industry, and are conventionally made through combining mineral wool, a lightweight aggregate material, cellulosic fiber, clay, and a binding agent, with water. More specifically, conventional fiber board panels typically contain the following ingredients in varying amounts: mineral wool, perlite, paper, starch, and optionally, clay.

Until now, the common belief has been that any increase in the strength of a fiber board panel would necessarily involve an increase in that panel's density, and therefore weight. Conversely, the belief has been that any decrease in a panel's density, and therefore weight, would necessarily involve a decrease in that panel's strength. Since, for use in the furniture industry, stronger panels are almost always preferred over weaker ones, while less dense, and therefore lighter, panels are preferred over those of higher density, this has proved to be a real problem.

The strength of a fiber board panel is typically referred to in terms of that panel's Modulus of Rupture ("MOR"). MOR refers to a panel's breaking point upon application of a specified amount of pressure, and is typically measured using the ASTM D-1037 static bending method, which is well-known in the art.

The high strength low density fiber board panels of the present invention were manufactured using the following ingredients: mineral wool, a lightweight aggregate material, cellulosic fiber, gypsum, and a binding agent. Surprisingly, it was found that by altering the amounts of the various ingredients panels having a significantly higher MOR could be produced without the expected significant increase in density, and conversely, that panels having a significantly lower density could be produced without the expected significant decrease in MOR.

A key ingredient in conventional fiber board panels is mineral wool. The presence of mineral wool provides bulk and strength to the panels, and helps render the panels relatively porous.

The conventional fiber board panels tested for purposes of the following examples contained approximately 42% to approximately 52% mineral wool. In the present invention, a mineral wool content ranging from approximately 0% to approximately 32.86% is contemplated. In the preferred embodiment, however, the mineral wool content is approximately 28%.

The next key ingredient in conventional fiber board panels is a lightweight aggregate material. Perlite is commonly used, due to its performance qualities and low cost. Perlite is a well known form of glassy rock, and generally contains 65–75% $SiO_2$, 10–20% $Al_2O_3$, 2–5% $H_2O$, and lesser amounts of soda, potash, and lime.

In preparing the perlite for use, the perlite is first ground to a size finer than minus 200 mesh. Once ground, the perlite is heated to a temperature of about 1500°–1800° F., and preferably to about 1750° F. The heating process is carried out in a perlite expander. First, the air is heated to approximately 1500° F. The finely ground perlite is then introduced into the heated air, which causes the perlite to expand. Once expanded, the perlite forms a light and fluffy material similar to pumice, and having a density of approximately 3.5–5 pcf. Perlite in this expanded form contributes significantly to the bulk, strength and porosity of the completed fiber board panels.

The density of expanded perlite varies according to the temperature to which the perlite is heated. Perlite heated to a temperature of about 1500°–1800° F. typically has a density of approximately 3.5–5 pcf. Heating the perlite to a lower temperature reduces the amount of expansion, resulting in perlite having a higher density. It is contemplated that perlite having a density up to approximately 20 pcf can be used in the present invention.

For purposes of the following examples, the conventional fiberboard panels tested contained between approximately 20% and approximately 25.4% perlite. In the present invention, a perlite content of approximately 25%–41% is contemplated.

The next key ingredient in conventional fiber board panels is cellulosic fiber. Paper fiber is very commonly used, and can be obtained from many sources, including hydropulp newsprint and scrap gypsum board panels, which would otherwise simply be thrown away.

As described in the examples below, conventional fiber board panels having a paper content of approximately 12% to approximately 28% were tested. The present invention contemplates a cellulosic fiber content of approximately 20% to approximately 35%. In the preferred embodiment, paper is the source of cellulosic fiber, at approximately 25% of the dry solids weight of the board panels.

The next key ingredient in conventional fiber board panels is a binding agent. Starch is very commonly used. Starch forms a viscous gel when dispersed in water and heated to approximately 180°–195° F. In the fiber board panel making process, the starch may be cooked prior to being added to the dispersion, or it may be added raw, in which case it will have an opportunity to be cooked during the panel drying process.

Conventional fiber board panels containing approximately 4.4%–12% starch were tested. The present invention contemplates a binding agent content of approximately 5% to approximately 9%. In the preferred embodiment, the binding agent is starch, and makes up approximately 9% of the dry solids weight of the panels.

Another ingredient often found in conventional fiber board panels is an inorganic filler material, such as clay, calcium carbonate ($CaCO_3$), or wallastonite, a mineral filler. In the conventional fiber board panels tested, clay made up between 0% and approximately 4% of the dry solids weight of the panel.

A final ingredient, not found in the conventional fiber board panels tested here, is gypsum. The solubility of the gypsum in the processing slurry enables the gypsum to function as a flocculent in the formulation. This flocculating function provides uniform distribution of fine particles, such as gypsum, perlite and starch, in the wet mat during processing of the panels. In the absence of this flocculating action, fine and high density particles tend to migrate to the bottom of the mat during processing, which can adversely affect drainage of the water from the wet mat.

In addition to the processing benefits provided by the gypsum, it also improves the properties of the present fiber board panel. The presence of gypsum in the formulation can significantly improve the surface hardness of the panels. Gypsum may also contribute to improved smoothness of the panel surface, thereby eliminating the need to apply a filler coat or to sand the dry mat to control the thickness of the finished product.

The gypsum source may be: calcium sulfate dihydrate, either uncalcined or calcined to hemihydrate and then rehydrated, or calcium sulfate anhydrite. Another possible source of gypsum is scrap gypsum wallboard or synthetic (by-product) gypsum. It has been found that scrap wallboard which would otherwise be thrown away, may be ground into gypsum particles, which can then be physically mixed with other ingredients to provide a slurry useful in the above-described water-felting process for preparing a fiber board panel.

The present invention contemplates a gypsum content of approximately 0% to approximately 23%. The preferred embodiment, regardless of source, has a gypsum content of approximately 10%.

The lightweight fiber board panels of the present invention were manufactured using a continuous flow water-felting process, which is very well known in the art. The basic technology for such manufacture is that disclosed in U.S. Pat. No. 5,558,710 to Baig, which is incorporated by reference herein.

First, a dispersion comprising mineral wool, a lightweight aggregate, gypsum, a cellulosic fiber, and a binding agent was prepared. The dispersion was then flowed onto a moving foraminous support wire, such as that of a Fourdrinier or Oliver mat forming machine, for dewatering. The dispersion was dewatered, first by gravity, and then by vacuum suction means. The wet mat was then dried in heated convection drying ovens, and the dried material was cut to the desired dimensions, which can vary widely depending on the particular application for which the board is being made.

In the following examples, the composition of various conventional fiber board panel formulations was altered, to determine what effect such alteration would have on the density and MOR of panels made with the formulation.

EXAMPLE 1

The composition of various thicknesses of fiber board panels having a density of approximately 18+/−2 pounds per cubic foot ("pcf") was altered to determine whether the panels could be made stronger without significantly increasing their density. Panels having a density within this range are typically used as office screens and dividers, tackboards, and partitions. The following compositions were compared:

| Composition (% dry solids content) | Control | Trial 1 | Trial 2 | Trial 3 | Trial 4 |
| --- | --- | --- | --- | --- | --- |
| mineral wool | 52 | 32.86 | 28 | 10 | 0 |
| perlite | 25.4 | 41.43 | 28 | 25 | 35 |
| paper | 18.2 | 20.71 | 25 | 35 | 35 |
| starch | 4.4 | 5 | 9 | 7 | 9 |
| gypsum | 0 | 0 | 10 | 23 | 21 |

The following results were obtained:

| Thickness (inches) | | Control | Trial 1 | Trial 2 | Trial 3 | Trial 4 |
| --- | --- | --- | --- | --- | --- | --- |
| ½ | Density (pcf) | 20.6 | 19.6 | 20.8 | 18.5 | 18.6 |
|  | MOR (psi) | 215 | 295 | 340 | 339 | 360 |
| ⅝ | Density (pcf) | 21.4 | — | 18.2 | — | — |
|  | MOR (psi) | 226 | — | 259 | — | — |

For each thickness, it was found that by decreasing the amount of mineral wool, increasing the amount of paper, and adding gypsum, MOR strength could be significantly increased without a corresponding significant increase in density.

EXAMPLE 2

The composition of various thicknesses of fiber board panels having a density of approximately 24+/−2 pcf was altered to determine the effect of such alteration on the panels' density and MOR. Panels having a density within this range are typically used for chalk boards, stoveboards and other such applications. The following compositions were compared:

| Composition (% dry solids content) | Control | Trial |
|---|---|---|
| mineral wool | 49 | 28 |
| perlite | 23 | 28 |
| paper | 12 | 25 |
| starch | 12 | 9 |
| clay | 4 | 0 |
| gypsum | 0 | 10 |

The following results were obtained:

| Thickness (inches) | Density (pcf) Control | Density (pcf) Trial | MOR (psi) Control | MOR (psi) Trial |
|---|---|---|---|---|
| 3/4 | 21.7 | 20.0 | 211 | 314 |
| 5/8 | 23.4 | 22.7 | 255 | 348 |
| 1/2 | 23.6 | 22.7 | 270 | 287 |

For each thickness, it was found that by decreasing the amount of mineral wool from 49% to 28%, increasing the amount of paper from 12% to 25%, and adding gypsum, MOR strength could be significantly increased with no significant increase in density.

EXAMPLE 3

The composition of various thicknesses of fiber board panels having a density of approximately 16+/−2 pcf was altered to determine the effect of such alteration on the panels' density and MOR. Panels having a density within this range are typically used for floor partitions, office screens, dividers and tackboards. The following compositions were compared:

| Composition (% dry solids content) | Control | Trial |
|---|---|---|
| mineral wool | 49 | 28 |
| perlite | 23 | 28 |
| paper | 12 | 25 |
| starch | 12 | 9 |
| clay | 4 | 0 |
| gypsum | 0 | 10 |

The following results were obtained:

| Thickness (inches) | Density (pcf) Control | Density (pcf) Trial | MOR (psi) Control | MOR (psi) Trial |
|---|---|---|---|---|
| 3/4 | 16.7 | 15.9 | 140 | 168 |
| 5/8 | 17.0 | 17.1 | 177 | 227 |

For each thickness, it was found that by decreasing the amount of mineral wool from 49% to 28%, increasing the amount of paper from 12% to 25%, and adding gypsum, MOR strength could be significantly increased with no significant increase in density.

EXAMPLE 4

The composition of 3/4" thick fiber board panels having a density of approximately 13+/−2 pcf was altered to determine the effect of such alteration on the panel' density and MOR. Panels having a density within this range are typically used for scaled down performance to meet economy requirements. The following compositions were compared:

| Composition (% dry solids content) | Control | Trial |
|---|---|---|
| mineral wool | 49 | 28 |
| perlite | 23 | 28 |
| paper | 12 | 25 |
| starch | 12 | 9 |
| clay | 4 | 0 |
| gypsum | 0 | 10 |

The following results were obtained:

| Thickness (inches) | Density (pcf) Control | Density (pcf) Trial | MOR (psi) Control | MOR (psi) Trial |
|---|---|---|---|---|
| 3/4 | 15.6 | 14.8 | 121 | 172 |

Again, it was found that by decreasing the amount of mineral wool from 49% to 28%, adding gypsum and increasing the amount of paper from 12% to 25%, MOR strength could be significantly increased, with no significant increase in the panel' density.

EXAMPLE 5

A sample fiber board panel was tested to determine what effect lowering its wool content and increasing its perlite content, without adding gypsum, would have on its density and MOR. The following compositions were compared:

| Composition (% dry solids content) | Control | Trial |
|---|---|---|
| mineral wool | 42 | 26 |
| perlite | 20 | 36 |
| paper | 28 | 29 |
| starch | 10 | 9 |

The following results were obtained:

| Thickness (inches) | Density (pcf) Control | Density (pcf) Trial | MOR (psi) Control | MOR (psi) Trial |
|---|---|---|---|---|
| 1/2 | 24.6 | 23.2 | 411 | 410 |

In contrast to the preceding examples, this particular alteration in the ingredients resulted in a board having a significantly lower density, with no significant decrease in MOR strength.

As the above examples clearly indicate, the present invention teaches that one can significantly increase the MOR strength of a fiber board panel without significantly increasing the density of the panel, or conversely, significantly decrease the density of a panel without significantly decreasing its MOR strength, simply by altering the composition of the panels.

While particular embodiments of the lightweight fiber board panel of the present invention have been shown and described, it will be appreciated by those skilled in the art that changes and modifications may be made thereto without departing from the invention in its broader aspects and as set forth in the following claims.

What is claimed is:

1. A high strength low density fiber board panel, comprising:

mineral wool, perite, cellulosic fiber, a binding agent and gypsum, wherein said mineral wool comprises approximately 0% to approximately 33%, said perite comprises approximately 25% to approximately 41%, said cellulosic fiber comprises approximately 20% to approximately 35%, said binding agent comprises approximately 5% to approximately 9%, and said gypsum comprises approximately 0% to 23%, of a dry solids weight of said panel.

2. The panel as defined in claim 1 wherein said mineral wool comprises approximately 28% of the dry solids weight of said panel.

3. The panel as defined in claim 1 wherein said perlite comprises approximately 28% of the dry solids weight of said panel.

4. The panel as defined in claim 1 wherein said cellulosic fiber comprises approximately 25% of the dry solids weight of said panel.

5. The panel as defined in claim 1 wherein said binding agent is starch comprising approximately 9% of the dry solids weight of said panel.

6. The panel as defined in claim 1 wherein said gypsum comprises approximately 10% of the dry solids weight of said panel.

7. A process for producing a high strength low density fiber board panel comprising:

providing a supply of perite comprising approximately 25% to approximately 41% of a day solids weight of said panel;

providing a supply of cellulosic fiber comprising approximately 25% to approximately 41% of a dry solids weight of said panel;

providing a supply of a binding agent comprising approximately 25% to approximately 41% of a day solids weight of said panel;

providing a supply of gypsum comprising approximately 25% to approximately 41% of a day solids weight of said panel;

preparing a dispersion of said lightweight aggregate material, said cellulosic fiber, said binding agent and said gypsum;

causing said dispersion to flow onto a dewatering means;

dewatering said dispersion to form a wet mat;

drying said mat; and cutting said mat to desired dimensions.

8. The process of claim 7 further including providing a supply of mineral wool, and wherein said mineral wool comprises approximately 0% to approximately 33% of a dry solids weight of said panel.

9. The process of claim 8 wherein said mineral wool comprises approximately 28% of said weight.

10. The process of claim 7 wherein said perite comprises between approximately 25% and approximately 41% of a dry solids weight of said panel.

11. The process of claim 10 wherein said perlite comprises approximately 28% of a dry solids weight of said panel.

12. The process of claim 7 wherein said cellulosic fiber comprises approximately 20% to approximately 35% of a dry solids weight of said panel.

13. The process of claim 7 wherein said binding agent is starch.

14. The process of claim 7 wherein said gypsum comprises approximately 10% of a dry solids weight of said panel.

15. A high strength low density fiber board panel comprising a mixture of perite, cellulosic fiber, a binding agent and gypsum, and having a thickness of approximately ½" to approximately ¾", and a density within the range of approximately 11–26 pounds per cubic foot, and an MOR strength within the range of approximately 168–411 pounds per square inch.

16. The panel defined in claim 15 further including mineral wool comprising approximately 0% to approximately 33% of a dry solids weight of said panel.

17. The panel defined in claim 16 wherein said mineral wool comprises approximately 28% of said weight.

18. The panel defined in claim 15 wherein said perite comprises approximately 25% to approximately 41% of a dry solids weight of said panel.

19. The panel defined in claim 18 wherein said perlite comprises approximately 28% of said weight.

20. The panel defined in claim 15 wherein said cellulosic fiber comprises approximately 20% to approximately 35% of a dry solids weight of the panel.

21. The panel defined in claim 20 wherein said cellulosic fiber comprises approximately 25% of said weight.

22. The panel defined in claim 15 wherein said binding agent is starch comprising approximately 5% to approximately 9% of a dry solids weight of the panel.

23. The panel defined in claim 22 wherein said binding agent is starch comprising approximately 9% of said weight.

24. The panel defined in claim 22 wherein said gypsum comprises approximately 0% to approximately 23% of a dry solids weight of said panel.

25. The panel defined in claim 24 wherein said gypsum comprises approximately 10% of said weight.

* * * * *